US009657157B2

(12) United States Patent
Randall et al.

(10) Patent No.: US 9,657,157 B2
(45) Date of Patent: May 23, 2017

(54) HALOGENATED DIENE RUBBER FOR TIRES

(71) Applicant: Bridgestone Corporation, Tokyo (JP)

(72) Inventors: Amy M. Randall, Akron, OH (US); Yaohong Chen, Akron, OH (US); William L. Hergenrother, Akron, OH (US); Sheel P. Agarwal, Solon, OH (US)

(73) Assignee: Bridgestone Corporation, Chuo-ku (JP)

( * ) Notice: Subject to any disclaimer, the term of this patent is extended or adjusted under 35 U.S.C. 154(b) by 344 days.

(21) Appl. No.: 14/401,760

(22) PCT Filed: May 15, 2013

(86) PCT No.: PCT/US2013/041199
§ 371 (c)(1),
(2) Date: Nov. 17, 2014

(87) PCT Pub. No.: WO2013/173486
PCT Pub. Date: Nov. 21, 2013

(65) Prior Publication Data
US 2015/0126642 A1 May 7, 2015

Related U.S. Application Data

(60) Provisional application No. 61/647,258, filed on May 15, 2012.

(51) Int. Cl.
*C08F 236/06* (2006.01)
*C08K 3/36* (2006.01)
*C08C 19/12* (2006.01)
*B60C 1/00* (2006.01)
*C08K 3/00* (2006.01)
*C08C 19/14* (2006.01)
*C08F 236/04* (2006.01)
*C08F 236/08* (2006.01)

(52) U.S. Cl.
CPC ............. *C08K 3/36* (2013.01); *B60C 1/0016* (2013.04); *C08C 19/12* (2013.01); *C08C 19/14* (2013.01); *C08F 236/04* (2013.01); *C08F 236/06* (2013.01); *C08F 236/08* (2013.01); *C08K 3/0033* (2013.01); *B60C 2200/10* (2013.04)

(58) Field of Classification Search
CPC ...................................................... C08K 3/36
USPC ...................................................... 523/155
See application file for complete search history.

(56) References Cited

U.S. PATENT DOCUMENTS

| | | | |
|---|---|---|---|
| 2,980,656 A | 4/1961 | Jones et al. | |
| 4,080,495 A | 3/1978 | Padget | |
| 4,342,670 A | 8/1982 | Ahagon et al. | |
| 4,381,374 A | 4/1983 | Hillman | |
| 4,405,759 A | 9/1983 | Jagtap | |
| 4,433,109 A | 2/1984 | Takeuchi et al. | |
| 5,063,268 A | 11/1991 | Young | |
| 5,089,563 A | 2/1992 | Wideman et al. | |
| 5,132,348 A | 7/1992 | Saito et al. | |
| 5,137,981 A * | 8/1992 | Yamada | C08C 19/12 525/332.3 |
| 5,264,494 A | 11/1993 | Ho et al. | |
| 5,705,549 A | 1/1998 | Hojo | |
| 5,817,719 A | 10/1998 | Zanzig et al. | |
| 5,969,053 A | 10/1999 | Bauman et al. | |
| 6,486,258 B1 | 11/2002 | Noguchi et al. | |
| 6,699,813 B2 | 3/2004 | Luo et al. | |
| 7,799,725 B2 | 9/2010 | Suzuki et al. | |
| 2001/0009948 A1 | 7/2001 | Hopkins et al. | |
| 2002/0198305 A1 | 12/2002 | Hopkins | |
| 2008/0242771 A1 | 10/2008 | Kulbaba et al. | |
| 2008/0293849 A1 * | 11/2008 | Winters | C08J 3/226 523/351 |
| 2009/0247695 A1 | 10/2009 | Nakamura et al. | |
| 2009/0283186 A1 | 11/2009 | Kaszas | |
| 2011/0060086 A1 | 3/2011 | Rodgers et al. | |
| 2011/0112212 A1 | 5/2011 | Kimura et al. | |
| 2013/0137832 A1 * | 5/2013 | Kreuder | B60C 1/00 525/332.8 |
| 2015/0126642 A1 | 5/2015 | Randall et al. | |

FOREIGN PATENT DOCUMENTS

| | | |
|---|---|---|
| EP | 0328291 A1 | 8/1989 |
| EP | 0545593 A1 | 6/1993 |
| EP | 0682071 A1 | 11/1995 |
| EP | 2230262 A1 | 9/2010 |

(Continued)

OTHER PUBLICATIONS

Canterino, P.J., "Chlorination of Emulsion-Polymerized Polybutadiene Rubber", In Industrial and Engineering Chemistry, Apr. 1957, vol. 49, No. 4, pp. 712-717.
Kim, J.K., "Utilization of Recycled Crumb Rubber as a Compounding Tool", In International Polymer Processing, 1998, vol. 13, No. 4, pp. 358-364.
Kawaguchi, et al., "Head-to-Head Polymers: 19.Chlorination of cis-1,4-Polybutadiene", In Polymer, Nov. 1982, vol. 23, 10 pages.
Kim, Dong Seok, International Search Report with Written Opinion from PCT/US2013/041199, 14 pp. (Sep. 5, 2013).
Chinese Patent Office, "Office Action for Chinese Patent Application No. 201380032036.1", Mailed Date: Feb. 25, 2016, 19 pages.
Chinese Patent Office, Office Action for Chinese Patent Application No. 201380032036.1, Mailed Date: Jul. 23, 2015, 12 pages.

(Continued)

*Primary Examiner* — Doris Lee
(74) *Attorney, Agent, or Firm* — Meredith E. Hooker; Nathan T. Lewis

(57) ABSTRACT

A rubber composition is provided that includes a partially halogenated diene polymer that has a controllable microstructure, and no more than about 50% of the n repeat units are in blocks of three or more consecutive units. In embodiments, a reinforcing filler is also included in the rubber composition. In embodiment, the rubber composition is formed into a tire component. A method of making the composition is also provided.

20 Claims, 5 Drawing Sheets

(56) References Cited

FOREIGN PATENT DOCUMENTS

| JP | 59-081352 | 5/1984 |
|---|---|---|
| JP | 5981352 A | 5/1984 |
| JP | 06001882 | 11/1994 |
| WO | 9823660 A1 | 6/1998 |
| WO | 2013173473 A1 | 11/2013 |

OTHER PUBLICATIONS

Abdullin, et al., "Chlorinated Polymers Based on Low-Molecular-Mass 1,2-Polybutadiene", In Polymer Science, Series B, vol. 51, Nos. 7-8, Pleiades Publishing, Ltd., 2009, pp. 303-308.

Hahn, et al., "Novel Polymeric Structures via the Chlorination of cis-1,4-Polybutadiene in the Presence of Aryl Nucleophiles", In Journal of Polymer Science, Part A: Polymer Chemistry Edition, vol. 31, No. 12, John Wiley & Sons, Inc., Nov. 1993, pp. 3039-3047.

Adams, Florian, "European Search Report for European Patent Application No. 13790793.7", Mailed Date: Mar. 22, 2016, 9 pages.

Seok, Kim Dung, "International Search Report for PCT Patent Application No. PCT/US2013/041177", Mailed Date: Sep. 2, 2013, 3 pages.

Wyman, et al., "Hydrocarbon Chlorinations With Phosphorus Pentachloride", Journal of Org. Chem., vol. 28, Nov. 1963, pp. 3173-3177.

Suter, et al., "Nature of Phosphorus(V) Chloride in Ionizing and Nonionizing Solvents", In Journal of the American Chemical Society, vol. 95, No. 5, Mar. 7, 1973, pp. 1474-1479.

Boyle, Robert C., "Non-Final Office Action for U.S. Appl.No. 13/895,346", Mailed Date: Dec. 15, 2014, 15 pages.

Burleson, David G., "Response to the Non-Final Office Action for U.S. Appl. No. 13/895,346", Filed Date: Mar. 16, 2015, 9 pages.

Boyle, Robert C., "Final Office Action for U.S. Appl. No. 13/895,346", Mailed Date: Apr. 13,2015, 28 pages.

Japanese Patent Office, "Office Action for Japanese Patent Application No. 2015-512795", Mailed Date: Mar. 28, 2017, 16 pages.

* cited by examiner

HALOGENATED DIENE RUBBER FOR TIRES

FIELD

The technology discussed herein relates generally to halogenated rubber polymers.

BACKGROUND

In the tire industry, rubber compositions are engineered to have a balance of properties; for example, durability (i.e. tensile strength and tear resistance), rolling resistance, and traction. Wet traction is valued for all-season tires and new polymers and methods are desired for increasing wet traction.

Halogenated rubbers have been known for many years. Halogenated butyl rubber is commonly used in the tire industry as air barrier for the inner liner or inner tube of a tire. However, halogenated diene rubbers such as natural rubber, polybutadiene, polyisoprene, and poly(styrene-butadiene) have been difficult to obtain in a form that is advantageous for usage in rubber compositions, particularly for tires. This is partly because halogenation methods typically used cause high amounts of gel and poorly controlled microstructures.

SUMMARY

A rubber composition is provided that includes a partially halogenated diene polymer and a reinforcing filler. The partially halogenated diene polymer includes n repeat units of one or more of the following formulae I and II:

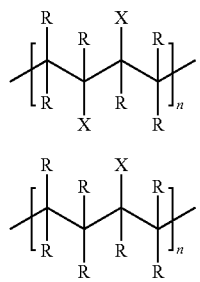

I.

II.

A tire is provided with a tire tread component that includes a rubber composition comprising: a partially halogenated diene polymer and a reinforcing filler. The partially halogenated diene polymer includes n repeat units of one or more of the following formulae I and II:

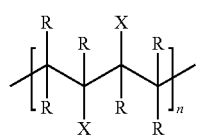

I.

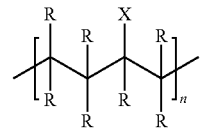

II.

wherein X is a halogen, each R is independently selected from H or a $C_1$-$C_{20}$ alkyl group and no more than about 50% of the n repeat units are in blocks of three or more consecutive units.

In an embodiment, method of making a rubber composition includes mixing a partially halogenated diene polymer and a reinforcing filler, that includes n repeat units of one or more of the following formulae I and II:

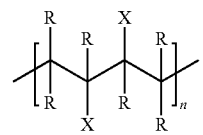

I.

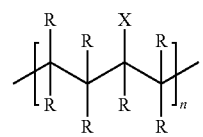

II.

wherein X is a halogen, each R is independently selected from H or a $C_1$-$C_{20}$ alkyl group and no more than about 50% of the n repeat units are in blocks of three or more consecutive units.

In an embodiment, a vulcanizable rubber composition comprises: a solution synthesized diene rubber polymer with a cis content of about 80% to about 99.9% that is partially halogenated; and a reinforcing filler; wherein the partially halogenated diene rubber exhibits a single glass transition peak.

In an embodiment, a rubber composition comprises a partially halogenated diene polymer, including n repeat units of one or more of the following formulae I-VI:

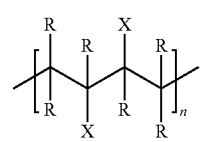

I.

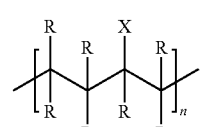

II.

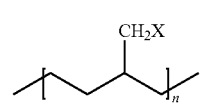

III.

-continued

IV.
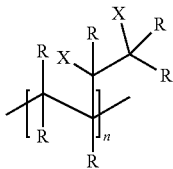

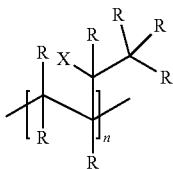

VI.
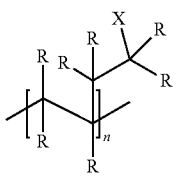

wherein X is a halogen, each R is independently selected from H or a $C_1$ to $C_{20}$ alkyl group; a reinforcing filler; and a curing agent.

In an embodiment, a tire comprises a vulcanized tire tread component including a rubber composition which comprises: a partially halogenated solution synthesized diene polymer, including n repeat units of one or more of the following formulae I-VI:

I.
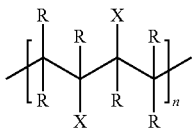

II.
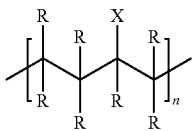

III.
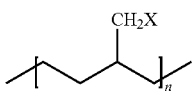

IV.
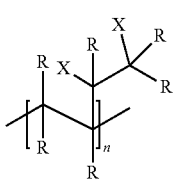

V.
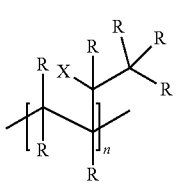

-continued

VI.
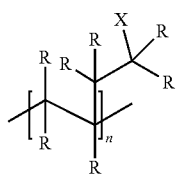

wherein X is a halogen, each R is independently selected from H or a $C_1$ to $C_{20}$ alkyl group; and no more than about 50% of the n repeat units are in blocks of three or more consecutive units; and a reinforcing filler.

In an embodiment, a method of making a composition for a tire component comprises mixing: a partially halogenated solution synthesized diene rubber, including n repeat units of one or more of the following formulae:

I.
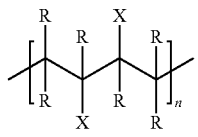

II.
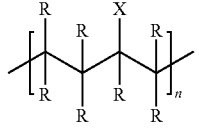

III.
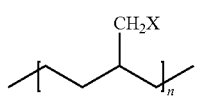

IV.
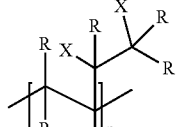

V.
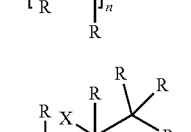

VI.
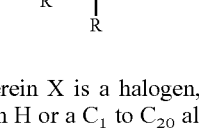

wherein X is a halogen, each R is independently selected from H or a $C_1$ to $C_{20}$ alkyl group; and no more than about 50% of the n repeat units are in blocks of three or more consecutive units; a reinforcing filler; and a curing agent.

As used herein, it should be understood that the term "a" means "one or more." In addition, as used herein, the term "polymer" should be construed to include copolymers, including terpolymers, and further combinations of repeat units different monomers, unless the context clearly indicates otherwise. The terms "repeat unit" and "monomer-contributed unit" are used synonymously herein.

The compositions disclosed herein and the compositions made by the methods disclosed herein may be incorporated into a tire tread, sidewall, or other tire portion.

This application claims benefit of priority to U.S. provisional application 61/647,258 filed on May 15, 2012, which is incorporated herein by reference in its entirety.

DETAILED DESCRIPTION

Figure 1:
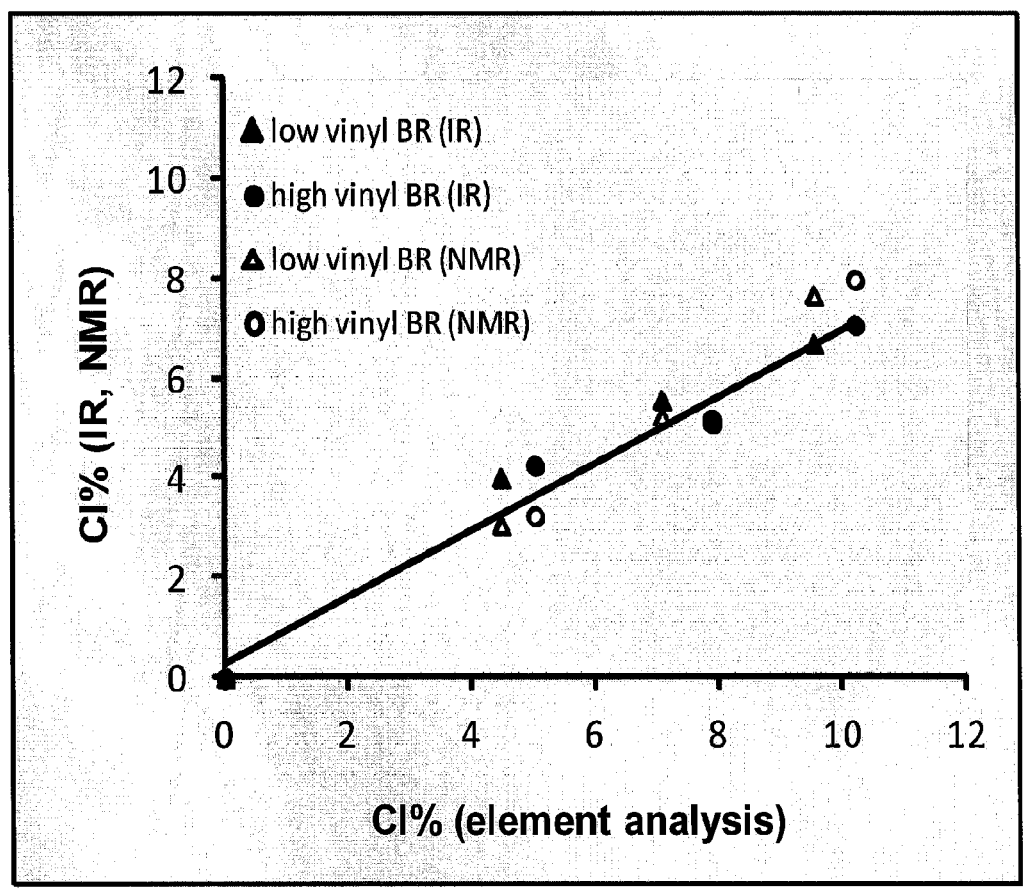
FIG. 1 is a graph showing the correlation of percent chlorine content of Examples 1, 2, and 4-9 measured by NMR/IR spectra versus the chlorine content measured by elemental analysis.

Unexpectedly, it was discovered that by halogenating solution synthesized diene polymers by a certain method that a halogenated polymer was synthesized that had a low gel content and that had the property of improving wet traction in tires. The halogen is added by an addition reaction to the double bonds of a solution synthesized diene polymer, which results in a novel microstructure with low gel content. This is in contrast to prior art methods of halogenation, particularly, chlorination of polymers with gaseous chlorine. Regarding free radical mechanisms for halogenation, halogenating agents such as trichloroisocyanuric acid showed very limited solubility in organic solvent and resulted in the high contents of gel and ill-defined microstructures.

Without being bound to theory, it is believed that this microstructure contributes to the reduced gel content and improved wet traction. Furthermore, without being bound by theory it is believed that one effect of the halogenated polymer in a filled rubber composition is that the halogen group has a greater affinity for the hydroxyl groups on the surface of the filler.

Testing data showed that the halogenation of the polymers significantly increased the Tg of the base polymer. While this effect may be responsible for an increase in the tan delta 0° C. prediction of wet traction behavior, British Pendulum Skid Tester (BPN) results also showed improvement in wet traction.

In an embodiment, the halogenated polymer is a solution synthesized polymer or copolymer having diene monomer units, that is partially halogenated, i.e. a halogenated diene polymer, and includes n repeat units of one or more of the following formulae I-III:

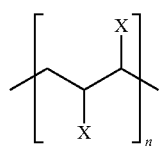
Ia

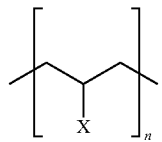
IIa or

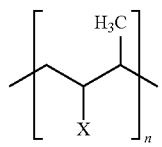
IIIa

X represents a halogen, such as chlorine, iodine, fluorine, bromine, or astatine. For the avoidance of doubt, the formulae above are not meant to limit the terminal ends of the halogenated polymer to a CH3 group. In fact, in an embodiment, the halogenated polymer may be terminated with a functional terminal group. In an embodiment, the halogenated diene polymer has a well-defined microstructure and does not cyclize. The above structures are meant include without limitation, for example, repeat units of halogenated butadiene, even though all four carbon atoms are not specified in formula Ia and IIa.

In an embodiment, the halogenated polymer is a solution synthesized polymer or copolymer having diene monomer units, that is partially halogenated, i.e. a halogenated diene polymer, and includes n repeat units of one or more of the following formulae I to VI:

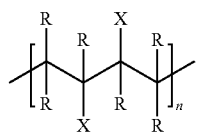
I.

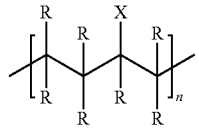
II.

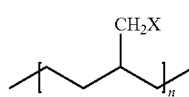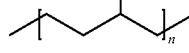
III.

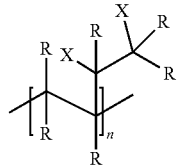
IV.

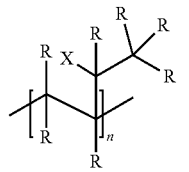
V.

-continued

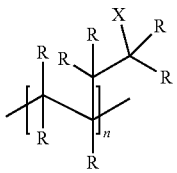

VI.

X represents a halogen, such as chlorine, iodine, fluorine, bromine, or astatine. R is independently selected from H or a $C_1$-$C_{20}$ alkyl group. For the avoidance of doubt, the formulae above are not meant to limit the terminal ends of the halogenated polymer to a CH3 group. In fact, in an embodiment, the halogenated polymer may be terminated with a functional terminal group. In an embodiment, the halogenated diene polymer has a well-defined microstructure and does not cyclize. In an embodiment, the partially halogenated polymer comprises units that are a subset of the above formulae I and II.

In a more specific example of the above embodiment, the halogenated polymer is a solution synthesized polymer or copolymer having diene monomer units, that is partially halogenated, i.e. halogenated diene polymer, and includes n repeat units of one or more of the following formulae Ib-IVb:

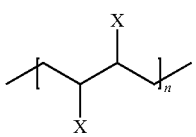

Ib.

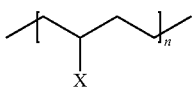

IIb.

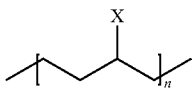

IIIb.

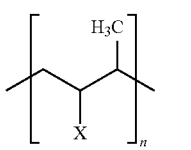

IVb.

X represents a halogen, such as chlorine, iodine, fluorine, bromine, or astatine. For the avoidance of doubt, the formulae above are not meant to limit the terminal ends of the halogenated polymer to a CH3 group. In fact, in an embodiment, the halogenated polymer may be terminated with a functional terminal group. In an embodiment, the halogenated diene polymer has a well-defined microstructure and does not cyclize.

In an embodiment, polybutadiene or a copolymer containing butadiene contributed units that is halogenated in the manner disclosed herein will result in a mixture of halogenated repeat units of formulae above. In an embodiment, polyisoprene or a copolymer containing isoprene contributed monomer units that is halogenated in the manner disclosed herein will result in a mixture of halogenated repeat units of formulae IIIa, IVb, or II.

The presence of repeat units having the structure above may be detected by proton NMR, as understood by those of skill in the art. For example, the microstructure and chlorine content of halogenated polymer may be calculated based on the integrated area of the peaks of vinyl (5 ppm), 1,4-(5.5 ppm) and Cl (3.8 ppm) as shown in H-NMR spectra in FIG. 5.

The variable n is related to the halogenation percentage of the polymer and the total number of repeat units in the polymer. In an embodiment, n may vary from 5 to about 10000, such as about 100 to about 1000, or about 250 to about 500. In an embodiment, the halogenated diene polymer is halogenated in a percentage of about 1% to about 70% by weight, such as about 5% to about 25%, about 6% to about 15%, or about 50% to about 65%. The halogenation percentage and n may be varied by increasing the amount of the halogenating agent or extending the reaction time.

In an embodiment, the diene polymer also includes different monomer-contributed units such as, for example, styrene. For example, the diene polymer may be selected from natural rubber, polybutadiene, polyisoprene, poly(styrene-butadiene), poly(styrene-isoprene), poly(butadiene-isoprene), or terpolymers of styrene, butadiene and isoprene. In an embodiment, the diene polymer is copolymer containing butadiene or isoprene.

In an embodiment, the halogenated polymer is cis-1,4 polybutadiene with a cis content of, for example, about 50% to about 99.9%, such as about 80% to about 95% or about 90% to about 99%. In an embodiment the halogenated polymer is a trans polybutadiene, with a trans content of about 50% to about 99%, such as about 60% to about 80%, or about 65% to about 75%. In an embodiment, the vinyl content may range from about 0.1% to about 70%, for example about 1% to about 10%, about 5% to about 25%, or about 40% to about 60%.

In an embodiment, the halogenated polymer has a weight average molecular weight (Mw) using GPC using a polystyrene standard of about 50,000 to about 1,000,000, such as, for example, about 100,000 to about 700,000, or about 150,000 to about 500,000. The polydispersity, (Mw/Mn) may, for example, range from about 1.03 to about 5, such as, from about 1.25 to about 3, or about 1.5 to about 3.5.

In an embodiment, the Tg of the halogenated diene polymer is significantly increased after halogenation, such as by at least about 1° C., such as about 3° C. to about 40° C., about 4° C. to about 20° C., or about 5° C. to about 25° C. higher than the non-halogenated polymer, depending on the degree of halogenation. In an embodiment, for approximately each 1% of halogenation a corresponding increase of approximately 2 degrees in the Tg was observed. The halogenated polymer may, for example, have a Tg of −10° C. to −115° C., such as about −50° C. to about −85° C., about or about −15° C. to about −45° C.

In an embodiment, no more than about 50% of the n repeat units are in blocks of three or more consecutive units, such as, for example, about 40% to about 1%, or about 25% to about 10% are in blocks of four or more repeat units. This microstructure may be characterized by observation of a single Tg peak, rather than separate Tg peaks for chlorinated and unchlorinated blocks.

In an embodiment, the gel content of the halogenated diene polymer is less than about 5% by weight, such as about 2% to about 0.001%, or about 0.5% to about 0.01%. The procedure for testing for gel content is described in the Examples section.

The polymer may contain remnants of the halogenating agent, for example a phosphorous based halogenating agent.

It may be present in amounts of about 1 ppm to about 1000 ppm, such as about 50 ppm to about 500 ppm, or about 100 ppm to about 300 ppm.

In the method of halogenation of the diene polymers herein, polybutadiene can be halogenated substantially without the formation of gel. For example, the halogenation may be performed by using a phosphorus pentachloride halogenation agent in methylene chloride solvent.

In an embodiment, the method includes synthesizing or providing an organic solution synthesized polymer that includes diene monomer-contributed units. Synthesis may be done according to methods known in the art, including synthesis of high-cis polybutadiene by rare earth catalyzed solution synthesis.

In an embodiment, the halogenation method includes dissolving the diene polymer in a suitable solvent. A suitable solvent is one that will dissolve the polymer and the halogenating agent. Example solvents include CH2Cl2, CCl4, toluene, chloroform, and benzene. The concentration of the polymer in the solvent may be, for example, about 0.001 to about 0.5 g/ml, such as, for example, about 0.01 to about 0.10 g/ml, or 0.03 to about 0.07 g/ml.

A halogenation agent is added to the dissolved polymer in solution. The halogenation agent may be a phosphorous based compound, such as PCl5 or PCl3. In an embodiment, compounds of phosphorous and other halogens may also be used, for example, PX5 where X is a halogen. The halogenation agent may be added in varying weight percentages of the polymer, such as about 0.5 to about 50, about 1 to about 40, or about 1.5 to about 25. The weight percentage of halogenating agent among other variables will control the percentage of halogenation.

In an embodiment, the mixture of halogenating agent and diene polymer in solution is added at a low temperature such as about −20° C. to about 10° C., about −5° C. to about 10° C., or about 0° C. to about ° 5 C. The mixture may be mixed at room temperature or higher, for a length of time, including about 1 hour to about 24 hours, or about 6 to about 12 hours. Temperature and stirring times may be varied to bring the reaction to a desired completion as known by those of skill in the art. In this method it is not necessary to cool the reaction to lower than room temperature.

After reaction, the halogenated diene polymer may be isolated by coagulation, such as coagulation in ethanol containing butylated hydroxytoluene (BHT) and dried by methods known in the art.

In an embodiment of the method of halogenation wherein the diene polymer is halogenated with PCl5 in methylene chloride solvent, the following Reaction I may occur to form the repeat unit structures I and II listed above:

wherein n represents the acyclic, aliphatic carbon-carbon double bond repeat units in the base polymer, m represents the number of halogenated repeat units and n-m equals the number of remaining unhalogenated acyclic, aliphatic carbon-carbon double bond repeat units after reaction. This reaction is also expected to apply to homopolymers such as polyisoprene and diene-containing copolymers containing comonomers such as styrene and others.

In an embodiment, the halogenated diene polymer may be present in the rubber composition in an amount of about 1 to about 100 phr, such as about 50 to about 75 phr, about 7 to about 20, about 5 to about 30 phr, or about 15 to about 50 phr.

The halogenated diene polymer may be compounded by methods generally known in the rubber compounding art, such as mixing the halogenated diene polymer alone or with additional polymers with conventional amounts of various commonly used additive materials, using standard rubber mixing equipment and procedures. Common additives include, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in conventional amounts, in addition to other conventional rubber additives including, for example, other fillers, plasticizers, antioxidants, cure agents and the like, using standard rubber mixing equipment and procedures.

For example, the additional polymer may be prepared by emulsion, solution, or bulk polymerization according to known suitable methods. Generally, mixing of components is accomplished in an internal mixer such as a Brabender or small size Banbury mixer, and because of the shear forces involved, the formulation process generally is exothermic and high temperatures are normal.

In one embodiment, a rubber composition is prepared by the steps of (a) mixing together at a temperature of about 110° C. to about 200° C. (drop temperature) in the absence of added sulfur and cure agents, the halogenated diene polymer, any other polymers, a reinforcing filler comprising silica or a mixture thereof with carbon black, and a filler coupling agent, (b) allowing the mixture to cool below the mixing temperature; (c) mixing the mixture obtained in step (b) at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes.

Reaction I

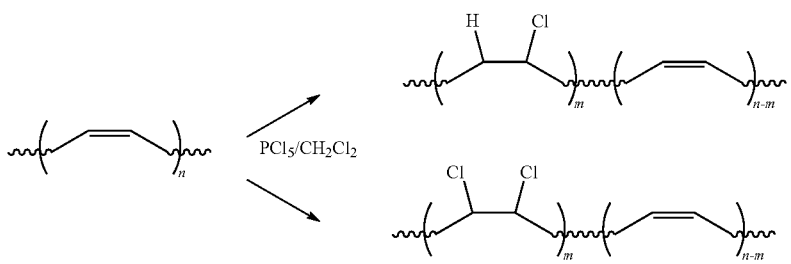

The drop temperature for mixing together the components also can be about 145° C. to about 190° C., such as about 155° C. to about 180° C.

The initial mixing step can optionally include at least two sub-steps: (i) mixing together at a temperature of about 110° C. to about 180° C., the halogenated diene polymer and any other elastomers, and at least a portion of the filler, (ii) cooling the mixture below the mixing temperature; and (iii) mixing the mixture obtained in step (ii) with the remainder of the filler, if any. The temperatures achieved by the at least two sub-steps can be the same or different from each other, within the temperature range of about 110° C. to about 180° C.

The method can further include a remill step in which either no ingredients are added to the first mixture, or only non-curing, non-polymeric, and non-filler ingredients are added. The remill stage may reduce the compound viscosity and improve the dispersion of the reinforcing filler. The drop temperature of the remill step is typically about 130° C. to about 175° C., such as about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., suitably about 60° C. to about 110° C., or about 75° C. to about 100° C.

An illustrative rubber composition comprising the halogenated diene polymer described above also includes (a) an optional additional polymer, and (b) reinforcing filler, such as carbon black or silica. One or more components selected from the group consisting of filler coupling agent, vulcanizing agent, vulcanization accelerator, tackifier resin, antioxidant, fatty acids, wax, peptizer, vulcanization retarder, activator, processing additive, plasticizer, pigments, and antiozonant.

The additional (non-halogenated) polymer may include, for example, one of the following polymers: natural rubber, synthetic rubber and blends thereof. Such rubbers include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber.

Examples of the vulcanizing agent include sulfur and sulfur donating compounds. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. The amount of the vulcanizing agent used in the rubber composition may be from 0.1 to 10 parts by weight, or from 1 to 5 parts by weight per 100 parts by weight of the rubber component. Specific examples include 1.5, 1.7, 1.87, and 2.0, and ranges including these endpoints.

The vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS). Example amounts of accelerators include 0.25, 0.5, 1.0, 1.5, 1.65, and 2.0 phr, and ranges including these endpoints. More than one accelerator may also be used.

Oil may be used as a compounding aid in rubber compositions. Examples of oil include, but are not limited to, aromatic, naphthenic, and/or paraffinic processing oils. In some applications, it may be preferable to use low-polycyclic-aromatic (PCA) oils, particularly oils that have a PCA content of less than 3%. A typical amount of oil in a composition may broadly range from about 0 phr to about 100 phr, from about 2 phr to about 70 phr, or from about 10 phr to about 50 phr, such as about 15 phr, about 20 phr, or about 30 phr, and ranges including these endpoints, based on 100 phr rubbery matrix in the rubber composition.

The reinforcing filler may be selected from the group consisting of carbon black, silica, and mixtures thereof. The total amount of reinforcing filler may be from about 1 to about 100 phr, from about 30 to about 80 phr, from about 40 to about 70 phr, or from about 50 to about 100 phr of filler.

Suitable carbon blacks include any of the commonly available, commercially-produced carbon blacks. Specific examples include carbon blacks having a surface area of at least 20 m2/g, or at least 35 m2/g up to 200 m2/g or higher. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, and N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or in an amount of about 5 to 80 phr, or in an amount of about 30 to about 80 phr. The useful upper range is limited by the high viscosity imparted by fillers of this type. Some of the commercially available silicas that can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

If silica is used as a filler, it may be desirable to use a coupling agent to couple the silica to the polymer. Numerous coupling agents are known, including but not limited to organo sulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyptetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)tri sulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis (tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl iso-propoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyetetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 1% to about 10% by weight of silica. For example, typical amounts of coupling agents include 4, 6, 8, and 10 phr.

Certain additional fillers may also be utilized, including mineral fillers, such as clay, talc, aluminum hydrate, aluminum hydroxide and mica. The foregoing additional fillers are optional and can be utilized in the amount of about 0.5 phr to about 40 phr.

Antioxidants may also be used in amounts including 0.5, 1, 1.5, 2.0, and 2.5 phr, and ranges including these amounts as endpoints. More than one type of antioxidant may be used in conjunction.

A vulcanized rubber product may be produced from the rubber composition that includes the halogenated rubber described above and other additives by shaping and curing the compound. The illustrative rubber compositions described herein can be used for tire treadstock, sidewall stock, or other tire component stock compounds. Such products can be built, shaped, molded and cured by various methods that are known and will be readily apparent to those having skill in the art. In an embodiment, a molded, unvulcanized tire is charged into a vulcanizing mold and then vulcanized to produce a tire.

The following examples are included to provide additional guidance to those skilled in the art in practicing the claimed invention. Accordingly, these examples are not intended to limit the invention, as defined in the appended claims, in any manner.

Example 1

In Example 1 a control low vinyl polybutadiene was synthesized. To a two gallon N2 purged reactor equipped with a stirrer, 0.79 kg of hexane and 3.69 kg of butadiene (22.2 wt % in hexane) were added. The reactor was charged with 4.96 ml of n-BuLi (1.60M) in hexane, and the reactor jacket was then heated to 60° C. After 25 minutes, the batch temperature peaked at 111° C. After an additional 30 minutes, the polymer cement was coagulated in isopropanol containing butylated hydroxytoluene (BHT) and drum dried. This was done twice to produce a control polybutadiene and a base polybutadiene for chlorination (see below).

Example 2

In Example 2 a control high-vinyl polybutadiene was synthesized as follows. To a two gallon N2 purged reactor equipped with a stirrer, 0.79 kg of hexane and 3.69 kg of butadiene (22.2 wt % in hexane) were added. The reactor was charged with 4.96 ml of n-BuLi (1.60M) in hexane and 2.44 ml of 2,2-bis(2'-tetrahydrofuryl)propane in hexane (1.6 M), and the reactor jacket was then heated to 60° C. After 15 minutes, the batch temperature peaked at 96° C. After an additional 30 minutes, the polymer cement was coagulated in isopropanol containing butylated hydroxytoluene (BHT) and drum dried. This was done twice to produce a control polybutadiene and a base polybutadiene for chlorination (see below).

Example 3

In Example 3 a high-cis polybutadiene was synthesized. A neodymium catalyst was prepared by mixing 10.84 mL methylaluminoxane (MAO, 3.03M) and 2.53 mL butadiene (22.2%), 0.59 mL NdV3 (0.537 M) and 6.17 ml diisobutyl aluminumhydride (DIBAH, 1.08M). After 2 minutes, 1.19 mL diethylaluminium chloride (DEAC, 1.07M) was added to the mixture and aged for 14 minutes.

To a two gallon N2 purged reactor equipped with a stirrer was added 1.36 kg of hexane and 3.09 kg of butadiene (22.2 wt % in hexane). The reactor was charged with the Nd-catalyst in toluene and rinsed with 30 ml toluene. The reactor jacket was then heated to 66° C. After 16 minutes, the batch temperature peaked at 92° C. After an additional 60 minutes, the polymer cement was collected in bottles, terminated with isopropanol containing butylated hydroxytoluene (BHT), and coagulated in IPA and drum dried as control polymers. This was done twice to produce a control polybutadiene and a base polybutadiene for chlorination (see below).

Example 4-6

In Examples 4-6, chlorination of the low vinyl polybutadienes of Example 1 was performed. 25 g of each polymer was dissolved in 500 ml CH2Cl2. PCl5 (4 g in Example 4, 6 g in Example 5, and 8 g in Example 6) dissolved in CH2Cl2 was added to each mixture at 0-5° C. and stirred at room temperature overnight. The amount of PCl5 that reacted with the polymer was determined upon the chlorine content in the polymer. The chlorinated polymers were coagulated in ethanol containing butylated hydroxytoluene (BHT) and dried under vacuum. The chlorinated polymers were free of gel.

Example 7-9

In Examples 7-9, chlorination of the high vinyl polybutadienes of Example 2 was performed. 25 g of each polymer was dissolved in 500 ml CH2Cl2. PCl5 (4 g in Example 7, 6 g in Example 8, 8 g in Example 9) dissolved in CH2Cl2 was added to each mixture at 0-5° C. and stirred at room temperature overnight. The amount of PCl5 that reacted with the polymer was determined upon the chlorine content in the polymer. The chlorinated polymers were coagulated in ethanol containing butylated hydroxytoluene (BHT) and dried under vacuum. The chlorinated polymers were free of gel.

Examples 10 and 11

In Examples 10 and 11 the high cis polybutadiene of Example 3 was chlorinated. In both Examples 10 and 11, 10 g of the polymers were dissolved in 400 ml CH2Cl2. PCl5 (6 g in Example 10 and 12 g in Example 11) dissolved in CH2Cl2 was added to the mixture at 0-5° C. and stirred for 1 hour at room temperature. The amount of PCl5 that reacted was determined upon the chlorine content in the polymer. The chlorinated polymers were coagulated in ethanol containing butylated hydroxytoluene (BHT) and dried under vacuum. The chlorinated polymers were free of gel.

Comparative Example 12

Comparative Example 12 was a commercial high-cis polybutadiene provided for comparison purposes. Table 1 lists its characteristics.

Comparative Example 13

As a comparative Example, the commonly used chlorinating agent trichloroisocyanuric acid (TCCA) was tried in combination with several different solvents and various chlorination conditions with low-vinyl, high-vinyl, and high-cis polybutadiene. Even though TCCA was reported to be a safe and efficient reagent for chlorination and oxidation in hydrophilic solvents, the application of TCCA in organic solvent was limited due to its poor solubility, the formation of the polymer gel. TCCA also caused the chlorination of solvents such as THF and toluene. Primarily because of the high gel content, meaningful data could not be obtained to compare with Examples 4-6.

Table 1 and Table 2 show various properties of the chlorinated polymers. The molecular weights were determined by GPC. The contents of vinyl-, cis- and trans-BR were determined by FTIR without considering chlorine. The chlorinated polybutadiene was confirmed by FTIR, 13C and 1H-NMR analysis. The absolute chlorine content was obtained by elemental analysis, showing a good correlation to IR or NMR estimation (FIG. 1). Elemental analysis also confirmed the discernible phosphorus (113 ppm) in the chlorinated polymers. This was a remnant of the halogenation agent. IR or NMR analysis provides a useful tool to estimate the chlorination degree in the polymer.

The gel content reported below was determined as follows:

0.2 g of sample was weighed to the nearest 0.1 mg. The weight was recorded and placed in a bottle. 100 ml of solvent was added by pipette, and the capped sample was allowed to dissolve overnight. After the sample had dissolved, the solution was filtered through 802 filter paper. 10 ml of the filtered solution was pipetted into a tared aluminum pan and evaporated to dryness on a warm hot plate. The weight of the residue was recorded to the nearest 0.1 mg. The filtered solution was placed in viscometry equipment and the viscosity of the sample was determined. The following equations show the calculations.

$$DSV = \ln(\text{solution flow time/solvent flow time})/W2*10\%$$

$$Gel = (1-(W2*10/W1))*100$$

where W1 is the weight of the original polymer and W2 is the weight of the residue.

TABLE 1

| | $M_n$ (kg/mol) | $M_w$ (kg/mol) | $M_w/M_n$ | Cis % | Trans % | Vinyl % | Cl % element analysis | Cl % IR | Cl % $^1$H-NMR | Cl % $^{13}$C-NMR | $T_g$ (° C.) | Gel % in toluene |
|---|---|---|---|---|---|---|---|---|---|---|---|---|
| Example 1 | 86 | 95 | 1.10 | 39.93 | 49.40 | 10.67 | 0 | 0 | 0 | 0 | −95.63 | 0 |
| Example 4 | 81 | 118 | 1.46 | 42.76 | 46.45 | 10.79 | 4.47 | 4.01 | 3.07 | n/a | −86.99 | 0.5 |
| Example 5 | 83 | 116 | 1.39 | 44.67 | 44.47 | 10.86 | 7.08 | 5.57 | 5.24 | n/a | −81.93 | 0.5 |
| Example 6 | 111 | 174 | 1.57 | 43.89 | 45.67 | 10.45 | 9.55 | 6.70 | 7.67 | 7.6 | −76.50 | 0 |
| Example 2 | 82 | 87 | 1.05 | 19.56 | 28.54 | 51.90 | 0 | 0 | 0 | o | −65.54 | 0 |
| Example 7 | 74 | 109 | 1.48 | 23.56 | 26.99 | 49.45 | 5.02 | 4.26 | 3.24 | n/a | −53.38 | 0.4 |
| Example 8 | 83 | 110 | 1.33 | 22.97 | 26.99 | 50.03 | 7.89 | 5.10 | 5.18 | n/a | −47.40 | 0.8 |
| Example 9 | 86 | 132 | 1.53 | 24.88 | 26.00 | 49.12 | 10.22 | 7.07 | 7.98 | n/a | −40.51 | 0.8 |

TABLE 2

| | $M_n$ (Kg/mol) | $M_w$ (Kg/mol) | $M_w/M_n$ | Cis % | Trans % | Vinyl % | Cl % (elemental analysis) | $T_g$ (° C.) | Gel % in toluene |
|---|---|---|---|---|---|---|---|---|---|
| Example 3 | 105 | 214 | 2.04 | 96.21 | 3.03 | 0.75 | 0 | −108.70 | 0 |
| Example 10 | 90 | 221 | 2.45 | 95.24 | 3.81 | 0.95 | 12.94 | −86.48 | 0.5 |

TABLE 2-continued

| | $M_n$ (Kg/mol) | $M_w$ (Kg/mol) | $M_w/M_n$ | Cis % | Trans % | Vinyl % | Cl % (elemental analysis) | $T_g$ (° C.) | Gel % in toluene |
|---|---|---|---|---|---|---|---|---|---|
| Example 11 | 98 | 256 | 2.62 | 92.66 | 5.53 | 1.82 | 26.85 | −49.49 | 0.4 |
| Comparative Example 12 | 113 | 260 | 2.3 | 95.5 | 3.2 | 1.3 | 0 | −105.0 | |

Figure 2:
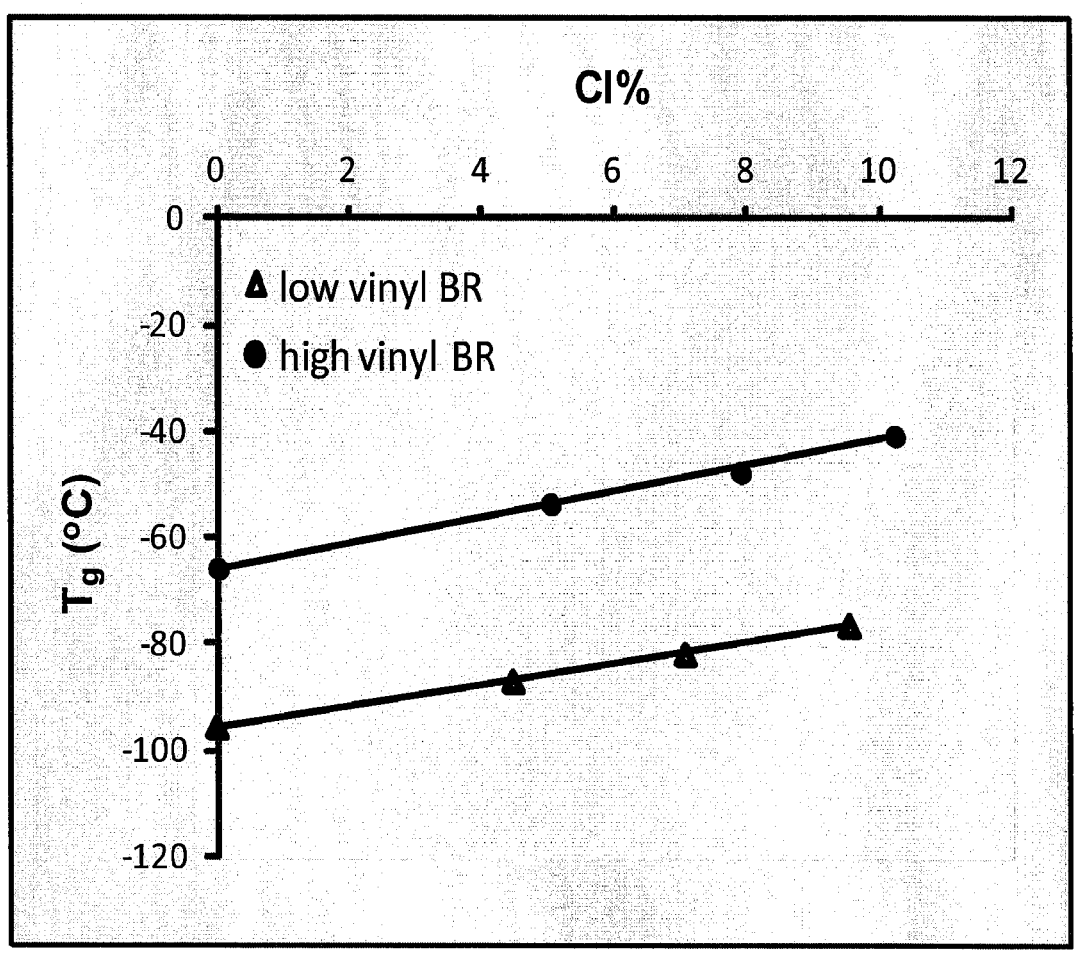
FIG. 2 is a graph showing the percentage of chlorine in Examples 1, 2, and 4-9 measured by elemental analysis, versus the Tg of the same polymers.

There was no significant change of the molecular weight and the polymer microstructures even though the 1,4-butadiene moieties on the polymer backbones seem to be more readily modified than the vinyl-butadiene moieties. An increase of the chlorine contents generally increased Tg as shown in FIG. 2. A single Tg peak was observed for the Examples, indicating that the chlorination was randomly distributed across the polymer chain and not in blocks of units. The chlorination of the anionic-polymerized polybutadiene significantly increased Tg without noticeable change of the polymer microstructures.

FIG. 1 is a graph showing the correlation of the chlorine content of Examples 1, 2, and 4-9 measured by NMR/IR spectra versus the chlorine content measured by elemental analysis.

FIG. 2 depicts the percentage of chlorine in Examples 1, 2, and 4-9 measured by elemental analysis, versus the Tg of the same polymers.

Figure 3:
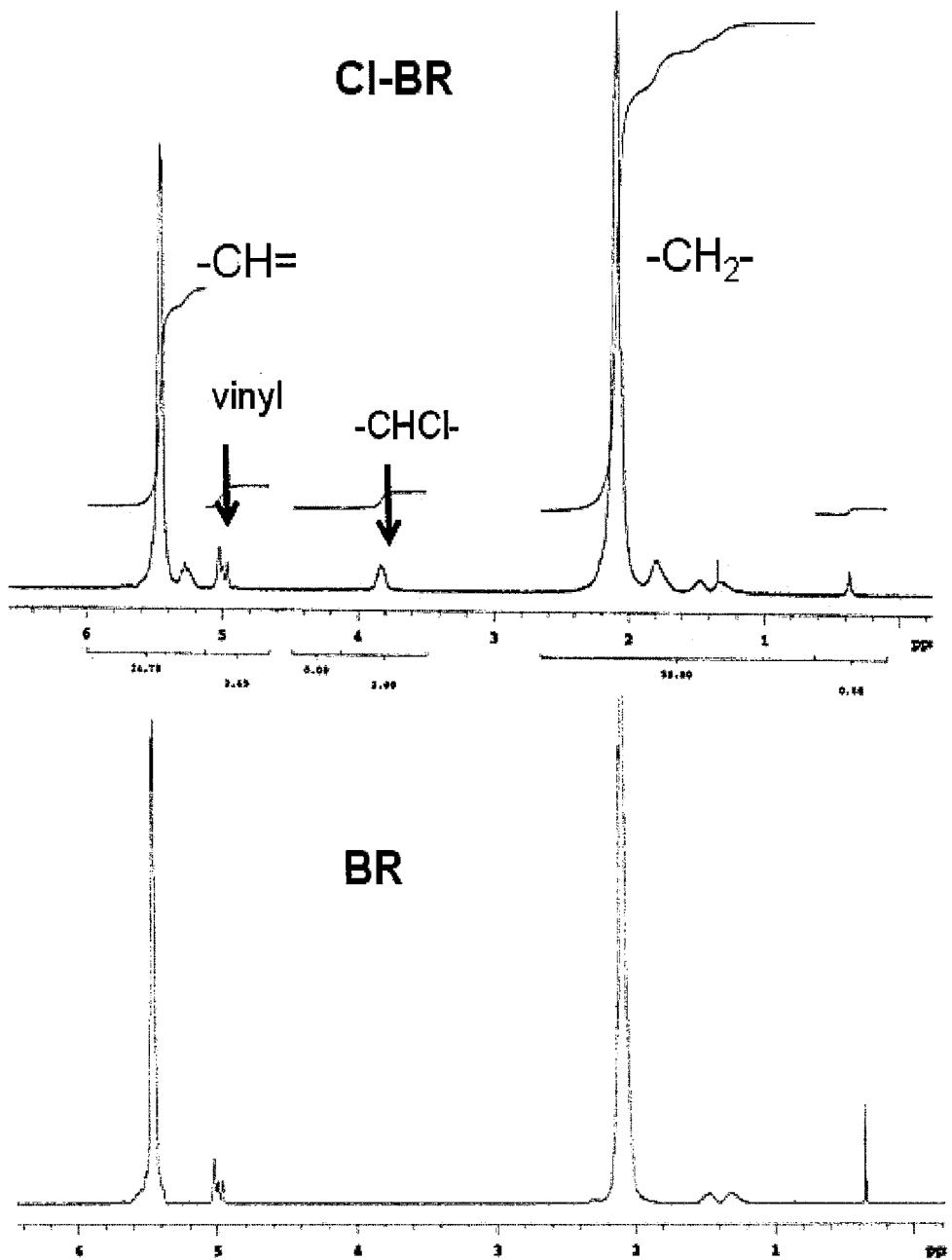
FIG. 3 is a proton NMR spectra of the Example 4 chlorinated polybutadiene (top) and the non-chlorinated polybutadiene of control Example 1 (bottom).

FIG. 3 is NMR data of the unhalogenated base polymer of Example 1 (bottom spectra), and the partially halogenated polymer of Example 4 (top spectra). The peak at about 3.8 ppm shows that a significant amount of CHCl groups have been formed from the double bonded carbons of the diene polymer. In contrast, an NMR spectra of Comparative Examples 3 and 12 would not show this peak at 3.8 ppm.

Figure 5:
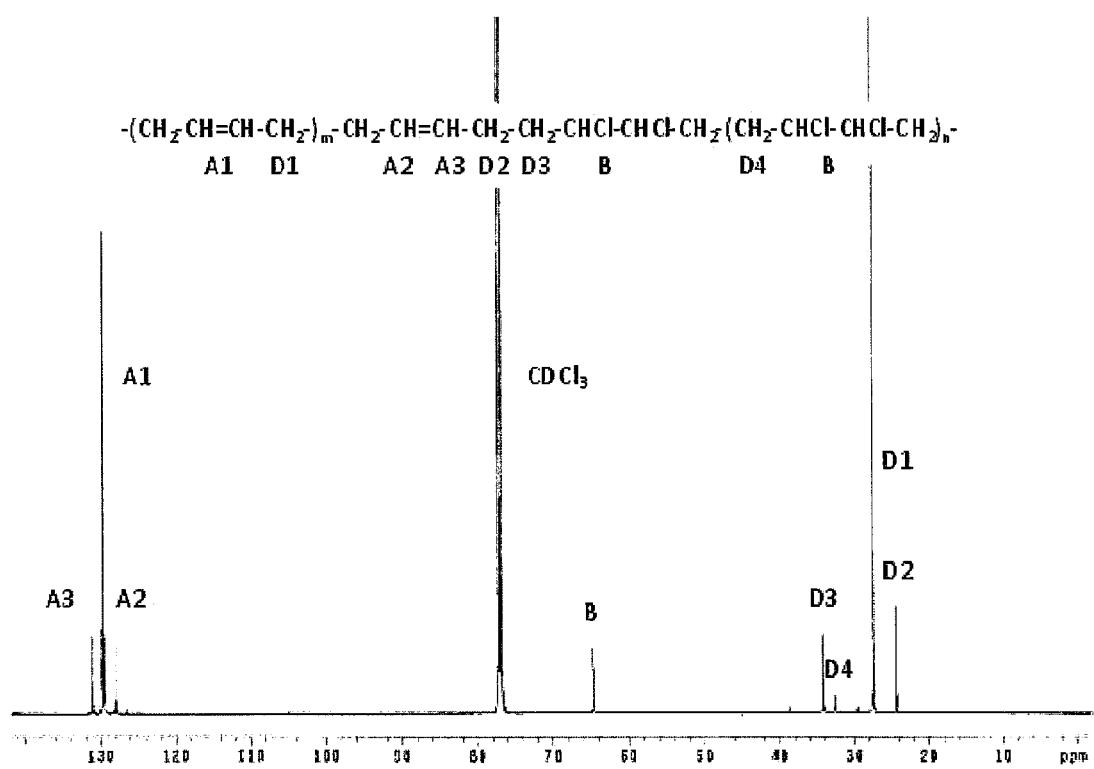
FIG. 5 is a detailed, labeled C13 NMR spectra of the polymer of Example 10.

FIG. 5 shows a detailed, labeled C13 NMR spectra of Example 10. Notably, the units of —CHCl—CHCl— were more randomized (D3) than blocked (D4).

Examples 14-22

In Example 14-22, several of the polymers synthesized above were compounded with common additives used in vulcanized rubber compositions. Table 3 shows the components that were mixed to form the rubber compounds in parts per hundred rubber (phr). Table 4 shows the mixing conditions.

TABLE 3

| | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Example 2 | 100 | 0 | 0 | 0 | 0 | 0 | 0 | 0 | 0 |
| Example 1 | 0 | 100 | 0 | 0 | 0 | 0 | 0 | 0 | 0 |
| Example 3 | 0 | 0 | 100 | 0 | 0 | 0 | 0 | 0 | 0 |
| Example 12 | 0 | 0 | 0 | 0 | 0 | 0 | 0 | 20 | 80 |
| Example 4 | 0 | 0 | 0 | 100 | 0 | 0 | 0 | 0 | 0 |
| Example 5 | 0 | 0 | 0 | 0 | 100 | 0 | 0 | 0 | 0 |
| Example 8 | 0 | 0 | 0 | 0 | 0 | 100 | 0 | 0 | 0 |
| Example 9 | 0 | 0 | 0 | 0 | 0 | 0 | 100 | 0 | 0 |
| Example 10 | 0 | 0 | 0 | 0 | 0 | 0 | 0 | 80 | 20 |
| Silica (phr) | 55 | 55 | 55 | 55 | 55 | 55 | 55 | 55 | 55 |
| Silane (phr) | 5 | 5 | 5 | 5 | 5 | 5 | 5 | 5 | 5 |
| Stearic acid (phr) | 2 | 2 | 2 | 2 | 2 | 2 | 2 | 2 | 2 |
| Wax (phr) | 1 | 1 | 1 | 1 | 1 | 1 | 1 | 1 | 1 |
| Antioxidant (phr) | 1 | 1 | 1 | 1 | 1 | 1 | 1 | 1 | 1 |
| black oil (phr) | 10 | 10 | 10 | 10 | 10 | 10 | 10 | 10 | 10 |
| Sulfur (phr) | 1.5 | 1.5 | 1.5 | 1.5 | 1.5 | 1.5 | 1.5 | 1.5 | 1.5 |
| TBBS (phr) | 0.7 | 0.7 | 0.7 | 0.7 | 0.7 | 0.7 | 0.7 | 0.7 | 0.7 |
| MBTS (phr) | 2 | 2 | 2 | 2 | 2 | 2 | 2 | 2 | 2 |
| DPG (phr) | 1.4 | 1.4 | 1.4 | 1.4 | 1.4 | 1.4 | 1.4 | 1.4 | 1.4 |
| ZnO (phr) | 2.5 | 2.5 | 2.5 | 2.5 | 2.5 | 2.5 | 2.5 | 2.5 | 2.5 |

TABLE 4

| Mixer: 65 g Brabender | Agitation Speed: 60 rpm |
|---|---|
| Master Batch Stage | |
| Initial Temperature | 110° C. |
| 0 min | charging polymer(s) |
| 0.5 min | charging filler, oil, wax, stearic acid, antioxidant |
| 5.5 min | Drop |
| Remill Stage | |
| Initial Temperature | 110° C. |
| 0 min | charging stock, small portion of silica and silane |
| 3.0 min | Drop |
| Final Batch Stage | |
| Initial Temperature | 75° C. |
| 0 sec | charging master stock |
| 30 sec | charging curing agents and accelerators |
| 150 sec | Drop at 105° C. |

TABLE 5

| | Example 14 | Example 15 | Example 17 | Example 18 | Example 19 | Example 20 | Example 16 | Example 21 | Example 22 |
|---|---|---|---|---|---|---|---|---|---|
| T90 (min): | 14.73 | 7.25 | 10.95 | 10.9 | 17.91 | 18.19 | 4.8 | 8.4 | 7.42 |
| CURE at 160 C. (min): | 20 | 15 | 15 | 15 | 20 | 20 | 12 | 12 | 12 |
| Compound Mooney (130 C.) ML1 + 4: | 9 | 12.6 | 35.5 | 60.6 | 48.9 | 81.8 | — | — | — |
| MICRODUMBELL TENSILE (23° C.) | | | | | | | | | |
| 300% Modulus (MPa): | — | 12.30 | — | — | — | — | 14.61 | — | — |
| Elongation (%): | 260.21 | 307.69 | 282.28 | 252.80 | 248.34 | 244.29 | 308.16 | 131.2 | 196.10 |
| Toughness (MPa): | 14.97 | 18.82 | 16.11 | 15.39 | 15.23 | 16.76 | 22.54 | 7.43 | 11.66 |
| BRITISH PENDULUM SKID TESTER | | | | | | | | | |
| Average: | 45.6 | 37.8 | 39.0 | 39.2 | 48.8 | 50.6 | 41 | 47 | 44 |
| Difference: | 0 | 0.0 | 1.2 | 1.4 | 3.2 | 5 | 0 | 6 | 3 |
| ROLLING RESISTANCE (60° C. tanδ) | | | | | | | | | |
| Average: | 0.1319 | 0.1248 | 0.1382 | 0.1203 | 0.1121 | 0.1109 | 0.0836 | 0.0795 | 0.0755 |
| % Reduction: | 0 | 0 | 11 | −4 | −15 | −16 | 0 | −5 | −10 |
| WET TRACTION (0° C. tanδ) | | | | | | | | | |
| Average: | 0.1807 | 0.1574 | 0.1634 | 0.1567 | 0.2354 | 0.3407 | 0.1272 | 0.1081 | 0.1202 |
| % Improvement: | 0 | 0 | 4 | 0 | 30 | 88 | 0 | −15 | −6 |
| TEMPERATURE SWEEP @ 2% | | | | | | | | | |
| $T_g$ (° C.): | −43.4 | −73.6 | −66.3 | −60.5 | −27.6 | −21.6 | −89.38 | −89.9 | −65.2 |
| $\Delta T_g$ (° C.): | 0.0 | 0.0 | 7.3 | 13.1 | 15.8 | 21.7 | 0 | 0 | 24.2 |
| STRAIN SWEEP (60° C.) [0.25-14%]: | | | | | | | | | |
| ΔG' (MPa): | 5.46 | 6.12 | 2.49 | 2.50 | 1.00 | 1.03 | 5.162 | 3.573 | 4.713 |
| STRAIN SWEEP (0° C.) [0.25-14%] | | | | | | | | | |
| ΔG' (MPa): | 8.86 | .06 | 3.82 | 3.30 | 2.38 | 2.62 | 7.617 | 5.985 | 6.477 |

Table 5 shows the results of the physical testing of the compounds of Examples 14-22. The chlorinated compounds have slightly longer T90 cure times and increasing compound Mooney values. The tensile properties are equivalent/slightly improved for the high vinyl chlorinated compounds and equivalent/slightly reduced tensile properties for the low vinyl and high-cis chlorinated compounds. The strain sweep results at 0° C. and 60° C. show that the chlorinated polymers have lower Payne Effect (ΔG') than the control indicating some improved polymer/filler interaction between the chlorinated polymer and the silica filler. The Tg of the chlorinated compounds is significantly increased by around 7-21° C. higher than the non-chlorinated control compounds. This significantly affects the tan delta 0° C. prediction of wet traction behavior. Therefore, a better wet traction predictor is the British Pendulum Skid Tester (BPN) results. The BPN shows an improvement of 1.2 to 6 points for the chlorinated compounds when compared to the non-chlorinated controls.

Examples 23-26

In Examples 23-26 a test was done to determine if the wet traction improvement was due only to the Tg increase. Here, a commercially available sample of partially chlorinated polyisoprene was mixed with a commercial polyisoprene (NATSYN from GOODYEAR). The chlorinated polyisoprene contained 65 wt % chlorination and was obtained from Sigma Aldrich (Cat. No. 462527). Both the chlorinated and unchlorinated polymers were determined to have the same Tg by DSC measurements (−65° C.). The chlorinated polyisoprene had the following formula V for n repeat units.

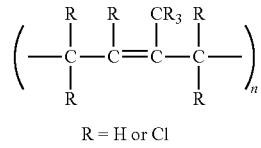

R = H or Cl

Table 6 shows the components of the tested formulations in phr. The 65% chlorinated polyisoprene was added incrementally (5 phr, 10 phr, and 15 phr). Thus, in Examples 24-26, the level of chlorination was effectively 3.25 phr, 6.5 phr, and 9.75 phr, respectively. Mixing was performed per the conditions of Table 4.

TABLE 6

| | Example 23 | Example 24 | Example 25 | Example 26 |
|---|---|---|---|---|
| NATSYN (Isoprene) | 100 | 95 | 90 | 85 |
| 65% Cl-IR from Aldrich | 0 | 5 | 10 | 15 |
| Si (phr) | 55 | 55 | 55 | 55 |
| Silane (phr) | 5 | 5 | 5 | 5 |
| Stearic acid (phr) | 2 | 2 | 2 | 2 |
| Wax (phr) | 2 | 2 | 2 | 2 |
| Antioxidant (phr) | 1 | 1 | 1 | 1 |
| black oil (phr) | 10 | 10 | 10 | 10 |
| Sulfur (phr) | 1.5 | 1.5 | 1.5 | 1.5 |
| TBBS (phr) | 0.5 | 0.5 | 0.5 | 0.5 |
| MBTS (phr) | 0.5 | 0.5 | 0.5 | 0.5 |
| DPG (phr) | 0.3 | 0.3 | 0.3 | 0.3 |
| ZnO (phr) | 2.5 | 2.5 | 2.5 | 2.5 |

Table 7 shows the results of the physical testing. The compositions have slightly increasing compound Mooney values as the chlorinated polymer content rises. The temperature sweep results show that the tan delta at 0° C. is increased by the chlorinated polymer. However, the Tg of the chlorinated compounds is unchanged between the control Example 23 and the chlorinated compounds. The BPN shows an improvement over the control Example 23 for Examples 24-26 by 0.8, 3.6 and 2.8 points, respectively. This corresponds to chlorine levels of 3.25 phr, 6.5 phr and 9.75 phr. These results support the view that the increase in wet traction is not just due to the increase in Tg.

TABLE 7

|  | Example 23 | Example 24 | Example 25 | Example 26 |
|---|---|---|---|---|
| T90 (min): | 4.06 | 3.84 | 3.86 | 4.21 |
| CURE at 160C (min): | 10 | 10 | 10 | 10 |
| Compound Mooney (130C) ML1 + 4: | 49 | 53.3 | 55 | 61.1 |
| MICRODUMBELL TENSILE (23° C.) | | | | |
| 300% Modulus (MPa): | 13.28 | 14.59 | 16.01 | 16.92 |
| Elongation (%): | 561.93 | 479.93 | 430.92 | 384.71 |
| Toughness (MPa): | 73.86 | 56.54 | 49.01 | 41.60 |
| BRITISH PENDULUM SKID TESTER | | | | |
| Swings 6-10 (Avg.): | 51 | 51.8 | 54.6 | 53.8 |
| Difference: | 0 | 0.8 | 3.6 | 2.8 |

TABLE 7-continued

|  | Example 23 | Example 24 | Example 25 | Example 26 |
|---|---|---|---|---|
| ROLLING RESISTANCE (60° C. tanδ) | | | | |
| Average: | 0.1133 | 0.1197 | 0.1388 | 0.1419 |
| % Reduction: | 0 | 6 | 23 | 25 |
| WET TRACTION (0° C. tanδ) | | | | |
| Average: | 0.1523 | 0.1593 | 0.1641 | 0.1721 |
| % Improvement: | 0 | 5 | 8 | 13 |
| TEMP SWEEP @ 2% | | | | |
| $T_g$ (° C.) @ 2%, 10 Hz: | −48.17 | −47.75 | −47.44 | −48.43 |
| STRAIN SWEEP (60° C.) [0.25-14%]: | | | | |
| ΔG' (MPa): | 5.956 | 7.400 | 8.750 | 11.065 |

Examples 27 and 28

In Example 27, to a two gallon $N_2$ purged reactor equipped with a stirrer was added 1.02 kg of hexane, 3.0 kg of butadiene (22.2 wt % in hexane) and 0.47 kg of styrene (33% in hexane). The reactor was charged with 3.31 mL of n-BuLi (1.60M) in hexane, 1.63 mL of 2,2-bis(2'-tetrahydrofuryl)propane in hexane (1.6 M), and the reactor jacket was then heated to 60° C. After 15 minutes, the batch temperature peaked at 96° C. After an additional 30 minutes, the polymer cements were coagulated in isopropanol containing butylated hydroxytoluene (BHT) and drum dried as a control Example.

In Example 28, 10 g of the SBR polymer synthesized in Example 27 was dissolved in 500 mL of CH2Cl2. 6.5 g of PCl5 dissolved in 150 mL of CH2Cl2 was added to the mixture at 0-5° C. and stirred at room temperature overnight. The chlorinated polymer was coagulated in ethanol containing butylated hydroxytoluene (BHT) and dried under vacuum.

Figure 4:
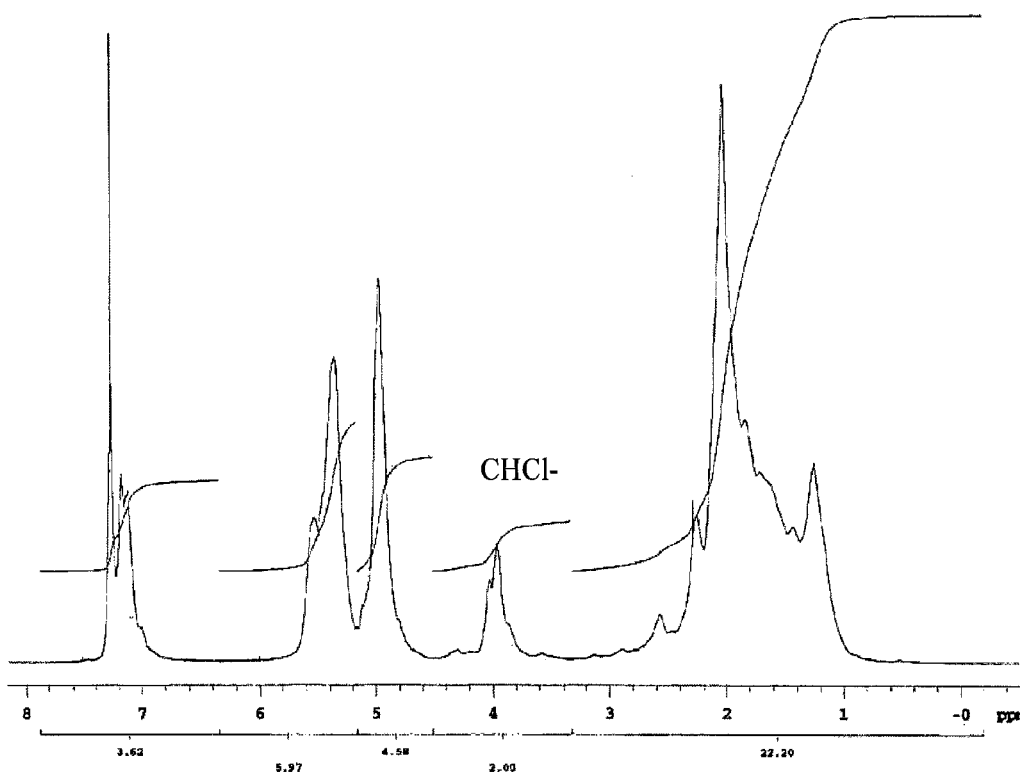
FIG. 4 is a proton NMR spectra of the chlorinated poly(styrene-butadiene) of Example 27 (top) and the non-chlorinated poly(styrene-butadiene) of control Example 26 (bottom).
Figure 4:
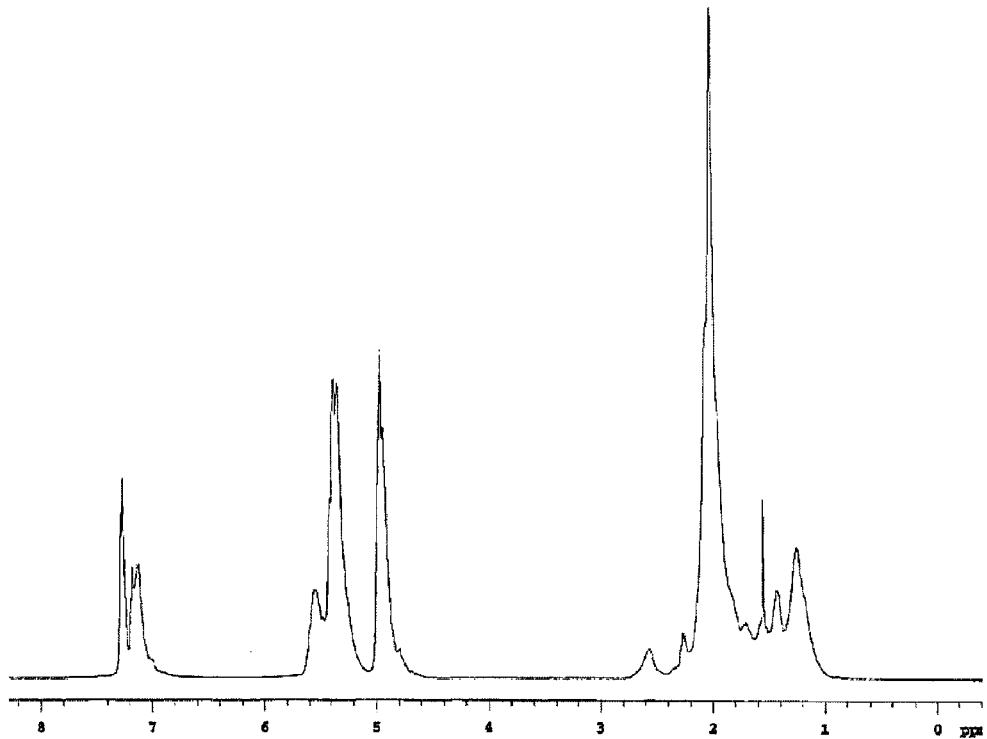

Table 8 reports several characteristics of control Example 27 and Example 28. FIG. 4 shows NMR spectra of control Example 27 (bottom) and the chlorinated SBR of Example 28 (top). The peak labeled CHCl shows the SBR was functionalized at an aliphatic carbon. This peak is not present in the spectra of control Example 27.

TABLE 8

| Sample ID | $M_n$ (kg/mol) | $M_w$ (kg/mol) | $M_w/M_n$ | 1,4 mol % | Vinyl mol % | Styrene mol % | Cl mol % | $T_g$ (° C.) | Gel % in toluene |
|---|---|---|---|---|---|---|---|---|---|
| Example 27 | 145 | 154 | 1.07 | 48.2 | 39.8 | 12.0 | 0 | −45.22 | 0 |
| Example 28 | 135 | 190 | 1.41 | 21.3 | 39.6 | 12.3 | 16.8 | −13.35 | 0 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A rubber composition comprising:
    a partially halogenated diene polymer, including n repeat units of one or more of the following formulae I-VI:

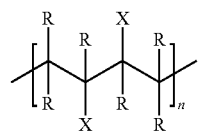

I.

-continued

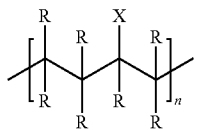
II.

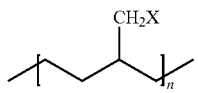
III.

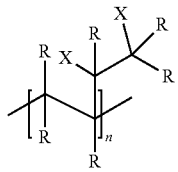
IV.

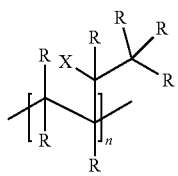
V.

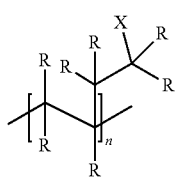
VI.

wherein X is a halogen, each R is independently selected from H or a $C_1$ to $C_{20}$ alkyl group;
no more than about 50% of the n repeat units are in blocks of three or more consecutive units; and
a reinforcing filler.

2. The rubber composition of claim 1, further comprising a vulcanizing agent.

3. The rubber composition of claim 1, further comprising remnants of a phosphorus-based halogenating agent.

4. The rubber composition of claim 1, wherein the gel content of the partially halogenated diene polymer is less than about 5%.

5. The rubber composition of claim 1, wherein the partially halogenated diene polymer is halogenated in a percentage of about 1% to about 70%.

6. The rubber composition of claim 1, wherein the reinforcing filler is silica.

7. The rubber composition of claim 1, wherein the partially halogenated diene polymer is a solution synthesized polymer.

8. The composition of claim 1, wherein the halogenated diene polymer is cis-1,4 polybutadiene having a cis content of about 80% to about 99.9%.

9. The composition of claim 1, wherein the n repeat units include at least one of formula I and formula II.

10. The rubber composition of claim 1, wherein the partially halogenated diene rubber exhibits a single glass transition peak.

11. A tire comprising:
a tire tread component comprising a rubber composition comprising:
a partially halogenated diene polymer, including n repeat units of one or more of the following formulae I-VI:

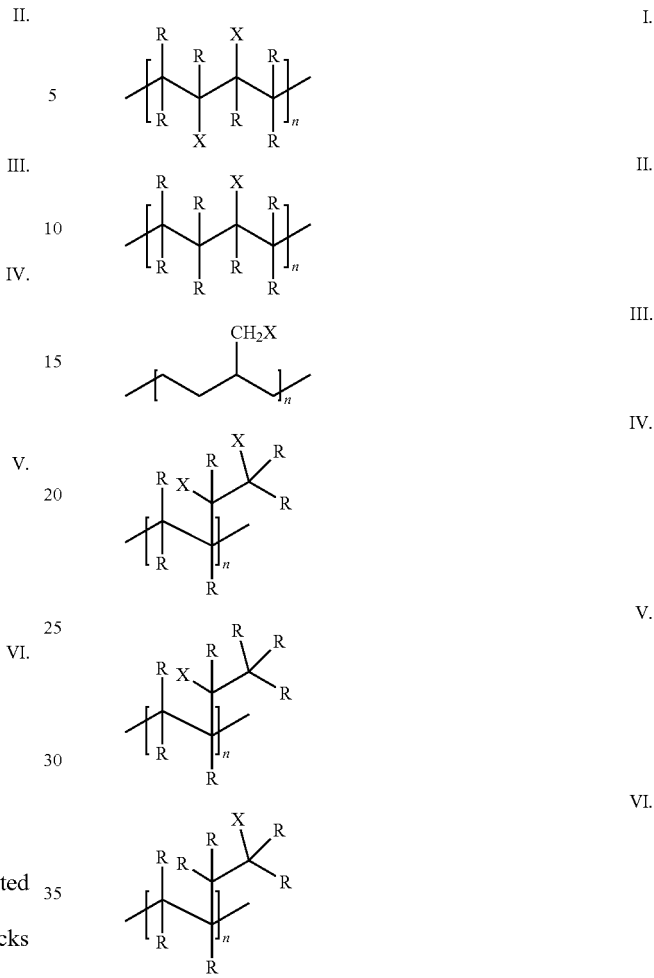

wherein X is a halogen, each R is independently selected from H or a $C_1$ to $C_{20}$ alkyl group; and
no more than about 50% of the n repeat units are in blocks of three or more consecutive units.

12. The tire of claim 11, wherein the n repeat units include at least one of formula I and formula II.

13. The tire of claim 11, wherein the gel content of the partially halogenated diene polymer is less than about 5%.

14. The tire of claim 11, wherein the partially halogenated diene polymer is halogenated to a percentage of about 1% to about 70%.

15. The tire of claim 11, wherein the partially halogenated diene polymer is a solution synthesized polymer.

16. The tire of claim 11, wherein the halogenated diene polymer is present in an amount of about 50 phr to about 100 phr.

17. The tire of claim 11, wherein the halogenated diene polymer is cis-1,4 polybutadiene having a cis content of about 80% to about 99.9%.

18. A method of making a composition for a tire component, comprising:
mixing:
a partially halogenated solution synthesized diene rubber, including n repeat units of one or more of the following formulae:

I. 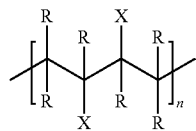

II. 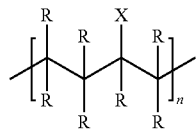

III. 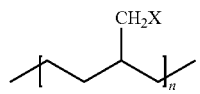

IV. 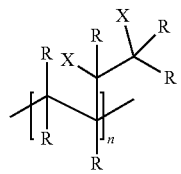

V. 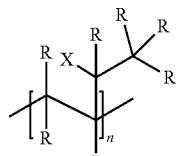

VI. 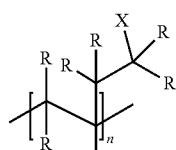
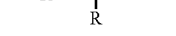

wherein X is a halogen, each R is independently selected from H or a $C_1$ to $C_{20}$ alkyl group; and no more than about 50% of the n repeat units are in blocks of three or more consecutive units;

a reinforcing filler; and a curing agent.

19. The method of claim 18, wherein the partially halogenated solution synthesized diene rubber is halogenated with a phosphorus-based halogenating agent.

20. The method of claim 18, wherein the partially halogenated solution synthesized diene rubber is halogenated with a phosphorus-based halogenating agent.

* * * * *